United States Patent
Chang et al.

(10) Patent No.: US 12,412,938 B2
(45) Date of Patent: Sep. 9, 2025

(54) ELECTRIC POWER SUPPLY SYSTEM FOR BATTERY ASSEMBLY CONTROL CIRCUIT OF ELECTRICITY STORAGE DEVICE, AND ELECTRICITY STORAGE DEVICE

(71) Applicant: SANYO Electric Co., Ltd., Kadoma (JP)

(72) Inventors: Jeewook Chang, Kanagawa (JP); Takahiro Kamikawa, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 554 days.

(21) Appl. No.: 17/911,265

(22) PCT Filed: Mar. 24, 2021

(86) PCT No.: PCT/JP2021/012184
§ 371 (c)(1),
(2) Date: Sep. 13, 2022

(87) PCT Pub. No.: WO2021/200445
PCT Pub. Date: Oct. 7, 2021

(65) Prior Publication Data
US 2023/0099799 A1  Mar. 30, 2023

(30) Foreign Application Priority Data

Mar. 30, 2020  (JP) ................. 2020-061461

(51) Int. Cl.
*H01M 10/48* (2006.01)
*H01M 10/44* (2006.01)
(Continued)

(52) U.S. Cl.
CPC ....... *H01M 10/482* (2013.01); *H01M 10/441* (2013.01); *H02J 7/0013* (2013.01); *H02J 7/007* (2013.01); *H02M 3/33569* (2013.01)

(58) Field of Classification Search
CPC ............ H01M 10/482; H01M 10/441; H02M 3/33569; H02J 7/0013
See application file for complete search history.

(56) References Cited

U.S. PATENT DOCUMENTS

| | | | |
|---|---|---|---|
| 7,939,968 B2 * | 5/2011 | Hjort ................ | H02J 9/062 307/64 |
| 9,231,440 B2 * | 1/2016 | Son .................. | H02J 9/062 |
| 2017/0070074 A1 | 3/2017 | Sugeno et al. | |

FOREIGN PATENT DOCUMENTS

| | | |
|---|---|---|
| JP | 2012-065518 A | 3/2012 |
| WO | 2015/186282 A1 | 12/2015 |

OTHER PUBLICATIONS

The International Search Report dated May 25, 2021, issued in counterpart Application No. PCT/JP2021/012184, with English Translation. (2 pages).

* cited by examiner

Primary Examiner — Adolf D Berhane
Assistant Examiner — Afework S Demisse
(74) Attorney, Agent, or Firm — WHDA, LLP

(57) ABSTRACT

Operating electric power is preferably supplied to a battery assembly control circuit from both a power converting device and a battery module. An electricity storage device includes a battery module including battery cells and a battery assembly control circuit, and a power converting device configured to charge the battery module with a commercial power supply and to supply electric power to a load. The power converting device supplies electric power to the battery assembly control circuit while an output voltage of the power converting device is higher than a predetermined voltage. The battery module starts to supply operating electric power to the battery assembly control circuit upon detecting that the electric power from the power converting (Continued)

device starts to be supplied to the battery assembly control circuit. The battery module stops supplying the electric power to the battery assembly control circuit when the battery module stops being discharged.

15 Claims, 2 Drawing Sheets

(51) Int. Cl.
*H02J 7/00* (2006.01)
*H02M 3/335* (2006.01)

ELECTRIC POWER SUPPLY SYSTEM FOR BATTERY ASSEMBLY CONTROL CIRCUIT OF ELECTRICITY STORAGE DEVICE, AND ELECTRICITY STORAGE DEVICE

CROSS-REFERENCE TO RELATED APPLICATION

This application is a National Phase Application filed under 35 U.S.C. § 371 of International Application No. PCT/JP2021/012184 filed on Mar. 24, 2021, which claims the benefit of priorities under 35 U.S.C. § 119 (a) of Japanese Patent Application No. 2020-061461 filed in Japan on Mar. 30, 2020, the contents of which are incorporated herein by reference.

TECHNICAL FIELD

The present invention relates to an electric power supply method for a battery assembly control circuit of an electricity storage device including the battery module and a power converting device configured to charge a battery module, and to the electricity storage device.

BACKGROUND ART

An electricity storage device including a battery module has been developed (PTL 1). The battery module has also been developed which includes a battery control circuit, in which a power supply circuit of the control circuit is used as a DC-DC converter that steps down a battery voltage of the battery module, and in which operating electric power is supplied from a battery of the battery module to the power supply circuit. The battery module provides an adverse effect that the battery consumes electric power in order to operate the control circuit. While the battery module is not used, that is, while the battery module is not discharged, the control circuit operates at predetermined time intervals and detects a remaining capacity, thus providing an adverse effect of electric power consumption in this state. Therefore, the power supply circuit supplies the operating electric power from the battery to the control circuit, thus providing an adverse effect that the battery is discharged by a dark current of the control circuit and over-discharged. Further, the battery voltage of the battery module decreases and provides a disadvantage that the voltage supplied to the control circuit decreases, preventing a normal operating state from being maintained.

CITATION LIST

Patent Literature

PTL 1: Japanese Patent Laid-Open Publication No. 2012-065518

SUMMARY OF THE INVENTION

Problem to be Solved by the Invention

The invention has been developed for the purpose of eliminating the above disadvantage, and an object of the invention is to provide a technique capable of stably supplying operating electric power to a battery control circuit from both commercial electric power and a battery module.

Solution to Problem

An electric power supply method according to an aspect of the invention is for a battery assembly control circuit of an electricity storage device including a battery module including rechargeable battery cells and the battery assembly control circuit, and a power converting device configured to charge the battery module using commercial electric power and supply the commercial electric power to a load. The power converting device supplies operating electric power to the battery assembly control circuit of the battery module while an output voltage of the power converting device is higher than a predetermined voltage. The battery module starts to supply operating electric power to the battery assembly control circuit in response to a connection signal from a connection detector which detects that the power converting device starts to supply electric power to the battery assembly control circuit. The battery module stops supplying the electric power to the battery assembly control circuit in response to a stop signal from a discharge-stop determination unit which detects that the battery module stops being discharged.

An electricity storage device according to an aspect of the invention includes: a power converting device configured to receive electric power from a commercial power supply and supply electric power to a load; a battery module including a plurality of rechargeable battery cells and a battery assembly control circuit; a switching circuit configured to switch electric power supplied to the battery assembly control circuit from the power converting device and the battery module; a connection detector configured to detect that the electric power is supplied from the power converting device to the battery assembly control circuit; and a discharge-stop determination unit configured to detect the stop of discharging of the battery module. The switching circuit is configured to: supply electric power from the power converting device to the battery assembly control circuit while an output voltage of the power converting device is higher than a predetermined voltage; supply operating electric power from the battery module to the battery assembly control circuit in response to a connection signal from the connection detector which detects that the electric power from the power converting device is supplied to the battery assembly control circuit; and stop supplying the electric power from the battery module to the battery assembly control circuit in response to a discharge-stop signal from the discharge-stop determination unit.

An electricity storage device according to another aspect of the invention includes: a power converting device configured to receive electric power from a commercial power supply and supply electric power to a load; a battery module including a plurality of rechargeable battery cells and a battery assembly control circuit; a DC-DC converter configured to supply operating electric power to the battery assembly control circuit; a switching circuit configured to switch connection between the power converting device and the battery module; a connection detector configured to detect that electric power is supplied from the power converting device to the battery assembly control circuit; and a discharge-stop determination unit configured to detect a stop of discharging of the battery module. The switching circuit is configured to: connect the power converting device to the DC-DC converter while an output voltage of the power converting device is higher than a predetermined voltage, the switching circuit connect the battery module to the DC-DC converter in response to a connection signal from the connection detector which detects connection between the power converting device and the DC-DC converter; and cuts off the connection between the battery module and the DC-DC converter in response to a discharge-stop signal from the discharge-stop determination unit.

Advantage of the Invention

The above-described electric power supply method for the battery assembly control circuit of the electricity storage device, and the electricity storage device have a feature that the operating electric power can be stably supplied to the battery assembly control circuit from both the power converting device and the battery module.

DESCRIPTION OF EMBODIMENTS

Figure 1:
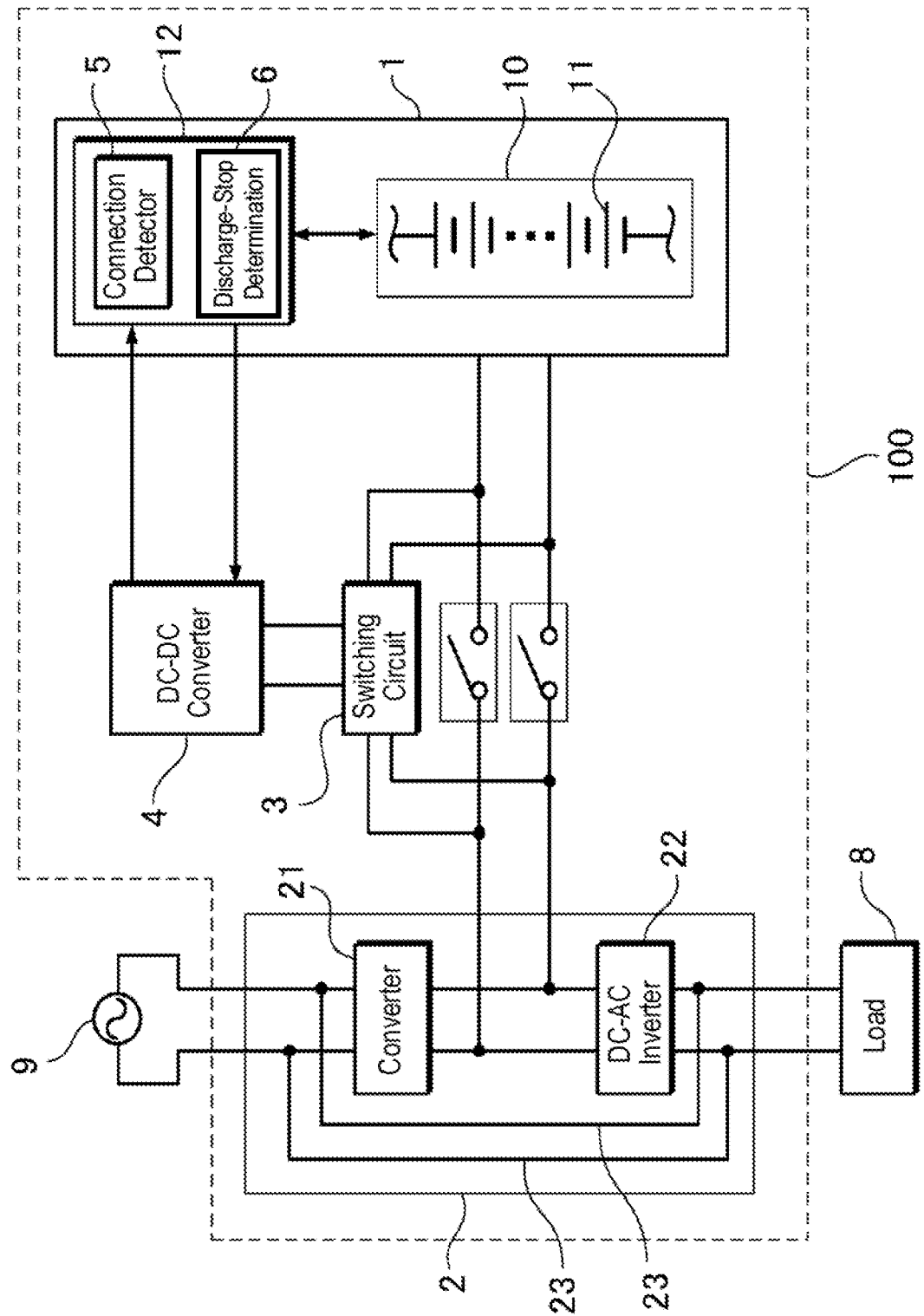
FIG. 1 is a block diagram of an electricity storage device according to an embodiment of the invention.

The invention will be detailed below with reference to the drawings. In the following description, terms indicating specific directions and positions (for example, "upper", "lower", and other terms including these terms) are used as necessary. The use of these terms is intended to facilitate understanding of the invention with reference to the drawings, and the technical scope of the invention is not limited by meanings of these terms. In addition, parts of the same reference numerals appearing in a plurality of drawings indicate the same or equivalent parts or members.

Further, embodiments to be described later are specific examples of a technical idea of the invention, and the invention is not limited to the following embodiments. In addition, dimensions, materials, shapes, relative arrangements, and the like of components to be described later are not intended to limit the scope of the invention only thereto and are intended to be exemplified unless otherwise specified. In addition, contents described in one embodiment and one example can also be applied to other embodiments and examples. The size, positional relationship, and the like of the members illustrated in the drawings may be exaggerated in order to clarify the description.

An electric power supply method according to a first aspect of the invention for a battery assembly control circuit of an electricity storage device including a battery module including a plurality of rechargeable battery cells and a battery assembly control circuit, and the power converting device configured to charge the battery module using commercial electric power and supply the commercial electric power to a load. Operating electric power is supplied from the power converting device to the battery assembly control circuit of the battery module while an output voltage of the power converting device is higher than a predetermined voltage. Operating electric power starts to be supplied from the battery module to the battery assembly control circuit in response to a connection signal from a connection detector which detects that the power converting device starts to supply electric power to the battery assembly control circuit. The electric power stops being supplied from the battery module to the battery assembly control circuit in response to a stop signal from a discharge-stop determination unit which detects that the battery module stops being discharged.

In the above-described electric power supply method for the battery assembly control circuit of the electricity storage device, since the operating electric power is supplied to the battery assembly control circuit from both the power converting device and the battery module, the operating electric power can be supplied in an ideal state without providing a dedicated power supply for the battery assembly control circuit. Since the battery assembly control circuit monitors a state of each battery cell, the battery assembly control circuit is maintained in an operating mode and consumes electric power while the battery module is not used, that is, while the battery module is not discharged. The electricity storage device includes a large number of battery cells in order to increase a charge and discharge capacity and output. Since the electricity storage device manages such a large number of battery cells, electric power consumption of the battery assembly control circuit becomes large. A conventional electricity storage device supplies electric power to a battery assembly control circuit by providing a dedicated power supply. The electricity storage device needs to include a dedicated power supply, which increases an equipment cost. The adverse effect can be eliminated by adjusting an output voltage of the power converting device or the battery module itself with a DC-DC converter and supplying the adjusted output voltage to the battery assembly control circuit. The electricity storage device that supplies electric power from the power converting device to the battery assembly control circuit can adjust a voltage of output of the power converting device by the DC-DC converter and supply the adjusted voltage to the battery assembly control circuit, but cannot supply operating electric power to the battery assembly control circuit while the power converting device does not output a voltage instead of while the power converting device always outputs a voltage. The power converting device outputs a voltage while charging the battery module and while supplying electric power to the load, but does not output a voltage while not charging the battery module and not supplying electric power to the load. The operating electric power can also be supplied to the battery assembly control circuit by adjusting the output voltage of the battery module, but the electricity storage device cannot supply operating electric power to the battery assembly control circuit when the voltage of the battery module decreases to the minimum voltage. In addition, a device that supplies operating electric power from the battery module to the battery assembly control circuit has an adverse effect that the battery module always consumes electric power and the voltage gradually decreases.

In the above-described electric power supply method for the battery assembly control circuit of the electricity storage device, operating electric power is supplied from both the power converting device and the battery module to the battery assembly control circuit. The operating electric power is supplied from the power converting device to the battery assembly control circuit while the output voltage of the power converting device is higher than the predetermined voltage. The operating electric power is supplied from the battery module to the battery assembly control circuit when the connection detector detects that the operating electric power is supplied from the power converting device to the battery assembly control circuit, and thus, the operating electric power is supplied from both the power converting device and the battery module to the battery assembly control circuit. In this state, when a decrease in the voltage of the battery module or the like causes an overdischarge, the discharge-stop determination unit detects the over-discharge and stops the supply of the electric power from the battery module. Therefore, the battery module can supply the electric power to the battery assembly control circuit without being over-discharged. Further, while the battery module is over-discharged, electric power can be supplied from the power converting device to the battery assembly control circuit to maintain the battery assembly control circuit in an operating state. When the voltage of the battery module decreases, the power converting device outputs a predetermined voltage in order to charge the battery module, and thus, in this state, operating electric power can be supplied to the battery assembly control circuit by output from the power converting device. Therefore, the above-described electric power supply system for the battery assembly control circuit of the electricity storage device can supply the operating electric power in the ideal state from both the power converting device and the battery module.

An electricity storage device according to a second aspect of the invention includes: a power converting device configured to receive electric power from a commercial power supply and supply electric power to a load; a battery module including a plurality of rechargeable battery cells and a battery assembly control circuit; a switching circuit configured to switch electric power supplied to the battery assembly control circuit from the power converting device and the battery module; a connection detector configured to detect that the electric power is supplied from the power converting device to the battery assembly control circuit; and a discharge-stop determination unit configured to detect the stop of discharging of the battery module. The switching circuit is configured to: supply electric power from the power converting device to the battery assembly control circuit while an output voltage of the power converting device is higher than a predetermined voltage; supply operating electric power from the battery module to the battery assembly control circuit in response to a connection signal from the connection detector which detects that the electric power from the power converting device is supplied to the battery assembly control circuit; and stop supplying the electric power from the battery module to the battery assembly control circuit in response to a discharge-stop signal from the discharge-stop determination unit.

The above-described electricity storage device supplies operating electric power from both the power converting device and the battery module to the battery assembly control circuit, supplies the operating electric power from the power converting device to the battery assembly control circuit in a state in which the output voltage of the power converting device is higher than the predetermined voltage, further supplies the operating electric power from the battery module to the battery assembly control circuit when the connection detector detects that the operating electric power is supplied from the power converting device to the battery assembly control circuit, and thus supplies the operating electric power from both the power converting device and the battery module to the battery assembly control circuit. In this state, when a decrease in the voltage of the battery module or the like causes an over-discharge, the discharge-stop determination unit detects the over-discharge and stops the supply of the electric power from the battery module. Therefore, the battery module can supply the electric power to the battery assembly control circuit without being over-discharged. Further, in a state in which the battery module does not supply the electric power to the battery assembly control circuit, electric power can be supplied from the power converting device to the battery assembly control circuit to maintain the battery assembly control circuit in an operating state. When the voltage of the battery module decreases, the power converting device outputs a predetermined voltage in order to charge the battery module, and thus, in this state, operating electric power can be supplied to the battery assembly control circuit by output from the power converting device. Therefore, the above-described electricity storage device can supply the operating electric power in the ideal state from both the power converting device and the battery module.

A power supply device according to a third aspect of the invention includes: a power converting device configured to receive electric power from a commercial power supply and supply electric power to a load; a battery module including a plurality of rechargeable battery cells and a battery assembly control circuit; a DC-DC converter configured to supply operating electric power to the battery assembly control circuit; a switching circuit configured to switch connection between the power converting device and the battery module; a connection detector configured to detect that electric power is supplied from the power converting device to the battery assembly control circuit; and a discharge-stop determination unit configured to detect a stop of discharging of the battery module. The switching circuit is configured to: connect the power converting device to the DC-DC converter while an output voltage of the power converting device is higher than a predetermined voltage, the switching circuit; connect the battery module to the DC-DC converter in response to a connection signal from the connection detector which detects connection between the power converting device and the DC-DC converter; and cuts off the connection between the battery module and the DC-DC converter in response to a discharge-stop signal from the discharge-stop determination unit.

In the electricity storage device according to a fourth aspect of the invention, the switching circuit includes: a first power switch connected between the power converting device and the DC-DC converter; and a first input circuit configured to control turning on and off of the first power switch by comparing the output voltage of the power converting device with the predetermined voltage. The first input circuit is configured to: supply electric power from the power converting device to the DC-DC converter by turning on the first power switch while the output voltage of the power converting device is higher than the predetermined voltage; and cut off the supply of the electric power from the power converting device to the DC-DC converter by turning off the first power switch while the output voltage of the power converting device is lower than the predetermined voltage.

According to a fifth aspect of the invention, the first input circuit includes a first control switch configured to switch turning on and off of the first power switch by being turned on and off controlled by the output voltage of the power converting device.

In the electricity storage device according to a sixth aspect of the invention, the first control switch comprises an FET and the first power switch comprises an FET. The FET of the first control switch is configured to control the first power switch to control supply of the electric power from the power converting device to the DC-DC converter.

In the electricity storage device according to a seventh aspect of the invention, the switching circuit includes: a second power switch connected between the battery module and the DC-DC converter; and a second input circuit configured to control turning on and off of the second power switch in response to the connection signal of the connection detector.

In the electricity storage device according to an eighth aspect of the invention, the second input circuit includes a second control switch configured to switch turning on and off of the second power switch by being switched in response to the connection signal from the connection detector.

In the electricity storage device according to a ninth aspect of the invention, the switching circuit includes: a second power switch connected between the battery module and the DC-DC converter; and a second input circuit configured to turning off the second power switch in response to the discharge-stop signal from the discharge-stop determination unit.

In the electricity storage device according to a tenth aspect of the invention, the second input circuit includes a second control switch configured to turn off the second power switch by being switched in response to the discharge-stop signal from the discharge-stop determination unit.

In the electricity storage device according to an eleventh aspect of the invention, the second power switch comprises an FET and the second control switch comprises an FET. The FET of the second control switch is configured to control supplying of electric power from the battery module to the DC-DC converter by controlling the second power switch.

In the electricity storage device according to a twelfth aspect of the invention, a back-flow prevention diode is connected between an output side of the power converting device and the DC-DC converter. Another back-flow prevention diode is connected between an output side of the battery module and the DC-DC converter.

In the electricity storage device according to a thirteenth aspect of the invention, the power converting device includes: a converter configured to charge the battery module using commercial electric power; and a DC-AC inverter configured to supply electric power of the battery module to the load.

Exemplary Embodiment 1

Electricity storage device 100 shown in FIG. 1 includes: power converting device 2 to which electric power is supplied from commercial power supply 9 and that is configured to supply the electric power to load 8; battery module 1 including plural chargeable battery cells 11 and battery assembly control circuit 12; switching circuit 3 configured to switch supply of power supply electric power from power converting device 2 and battery module 1 to battery assembly control circuit 12; connection detector 5 configured to detect the supply of the electric power from power converting device 2 to battery assembly control circuit 12 and output a connection signal; and discharge-stop determination unit 6 configured to detect that discharged battery module 1 is in a discharge-stop state and output a discharge-stop signal.

Battery Module 1

Battery module 1 includes battery assembly 10 including plural chargeable battery cells 11 connected to one another and battery assembly control circuit 12 connected to battery assembly 10 and configured to control charging and discharging of battery assembly 10. The invention does not specify a circuit configuration of battery assembly control circuit 12. Battery assembly control circuit 12 may include, for example, a protection circuit, such as a circuit configured to detect a voltage or a remaining capacity of battery assembly 10 or battery cells 11 or to equalize the voltage or the remaining capacity of battery cells 11 or battery assembly 10, and a charge and discharge control circuit.

Power Converting Device 2

Power converting device 2 configured to supply the electric power supplied from commercial power supply 9 to battery module 1 to charge battery module 1. In electricity storage device 100, when load 8 operates without commercial electric power is supplied to the load, the electric power is supplied from battery module 1 to load 8. Power converting device 2 includes converter 21 configured to convert the commercial electric power into a charging voltage of battery module 1, and DC-AC inverter 22 configured to convert a direct-current (DC) output from battery module 1 into an alternating-current (AC) voltage to be supplied to load 8. Load 8 is connected to an output side of DC-AC inverter 22. Power converting device 2 includes bus line 23 configured to directly supply commercial power supply 9 to load 8 and supply electric power to load 8 via bus line 23 while the commercial electric power is supplied.

A power supply circuit of battery assembly control circuit 12 is connected to power converting device 2 and battery module 1 via DC-DC converter 4 and switching circuit 3, and is supplied with DC operating electric power from one or both of power converting device 2 and battery module 1 via DC-DC converter 4. DC-DC converter 4 is configured to convert, for example, a high voltage of power converting device 2 or battery module 1, for example, ranging from 400V to 600V, into a power supply voltage of battery assembly control circuit 12, for example, a DC voltage ranging from 24V to 5V, and outputs the DC voltage.

Switching Circuit 3

Switching circuit 3 is configured to switch the operating electric power supplied to battery assembly control circuit 12 from one or both of power converting device 2 and battery module 1 via DC-DC converter 4. Switching circuit 3 supplies operating electric power from power converting device 2 to battery assembly control circuit 12 when an output voltage of power converting device 2 is higher than a predetermined voltage. When the operating electric power is supplied from power converting device 2, battery assembly control circuit 12 is activated, and connection detector 5 detects start of the supply of the electric power from power converting device 2 to battery assembly control circuit 12. When connection detector 5 detects the start of the supply of the electric power from power converting device 2, connection detector 5 outputs a connection signal to switching circuit 3. Upon receiving the connection signal from connection detector 5 to switching circuit 3, switching circuit 3 starts supplying the operating electric power from battery module 1 to battery assembly control circuit 12. When the electric power is supplied from battery module 1 to battery assembly control circuit 12, battery module 1 is discharged, and discharge-stop determination unit 6 detects that the discharge of battery module 1 stops, discharge-stop determination unit 6 outputs a discharge-stop signal to switching circuit 3. In this state, switching circuit 3 stops supplying the electric power from battery module 1 to battery assembly control circuit 12. Discharge-stop determination unit 6 stores a condition for stopping the discharge of battery module 1. When battery module 1 meets this condition, discharge-stop determination unit 6 outputs the discharge-stop signal to switching circuit 3, and switching circuit 3 stops the supply of the electric power from battery module 1 to battery assembly control circuit 12.

Figure 2:
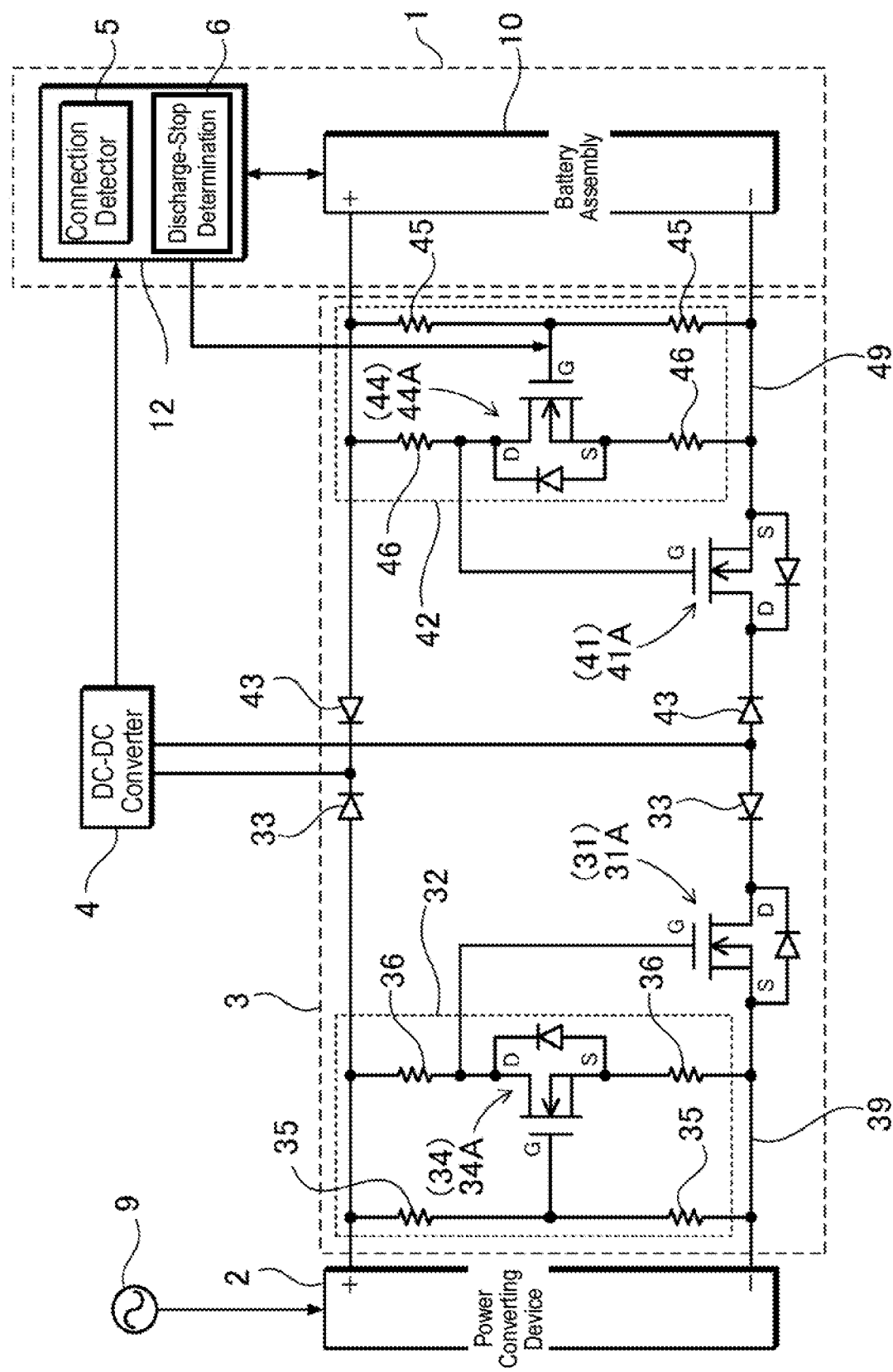
FIG. 2 is a block diagram of a switching circuit of the electricity storage device shown in FIG. 1.

Switching circuit 3 shown in FIG. 2 switches the connection between DC-DC converter 4 and power converting device 2 and the connection between DC-DC converter 4 and battery module 1 so as to control the supply of the electric power from power converting device 2 to battery assembly control circuit 12 and the supply of the electric power from battery module 1 to battery assembly control circuit 12. Switching circuit 3 shown in FIG. 2 controls supply of electric power from power converting device 2 to DC-DC converter 4 with first power switch 31. First input circuit 32 is configured to turning on and off of first power switch 31. First input circuit 32 controls turning on and off of first power switch 31 by comparing the output voltage of power converting device 2 with the predetermined voltage.

First Power Switch 31

First power switch 31 is an n-channel power MOSFET, and is connected between an output terminal at a negative side of power converting device 2 and DC-DC converter 4. First power switch 31 connects back-flow prevention diode 33 in series to connects the negative side of power converting device 2 to DC-DC converter 4 via a series circuit of first power switch 31 and back-flow prevention diode 33 connected in series to each other. First input circuit 32 is configured to control turning on and off of first power switch 31. Upon being turned on, first power switch 31 allows the electric power to be supplied from power converting device 2 to DC-DC converter 4, and allows operating electric power to be supplied from DC-DC converter 4 to battery assembly control circuit 12. Upon being turned off, first power switch 31 cuts off the supply of the electric power to DC-DC converter 4, and stops the supply of the electric power from power converting device 2 to battery assembly control circuit 12.

First Input Circuit 32

First input circuit 32 turns on first power switch 31 when the output voltage of power converting device 2 is higher than the predetermined voltage so as to supply electric power from power converting device 2 to DC-DC converter 4, and to supply operating electric power from power converting device 2 to battery assembly control circuit 12. First input circuit 32 turns off first power switch 31 when the output voltage of power converting device 2 is lower than the predetermined voltage so as to cut off the supply of the electric power from power converting device 2 to DC-DC converter 4, that is, cut off the supply of the electric power from power converting device 2 to battery assembly control circuit 12. The predetermined voltage is lower than the output voltage of power converting device 2 while the commercial electric power is supplied. The state in which the output voltage of power converting device 2 is higher than the predetermined voltage is a state in which power converting device 2 is connected to the commercial electric power. In this state, the operating electric power is supplied from power converting device 2 to battery assembly control circuit 12.

First input circuit 32 includes first control switch 34 that switches first power switch 31 on and off. First control switch 34 is turned on and off based on the output voltage of power converting device 2, and turns on and off first power switch 31. First control switch 34 is an n-channel FET, and controls turning on and off of first power switch 31 by turning on and off first control FET 34A. Upon being turned on, first control FET 34A turns on first power switch 31. Upon being turned off, first control FET 34A turns off first power switch 31.

A gate of first control FET 34A, which is first control switch 34, is connected to an output side of power converting device 2 via first input resistor 35. First control FET 34A is turned on and off based on the output voltage of power converting device 2. First control FET 34A includes a drain connected to a positive-side output of power converting device 2 via second input resistor 36, and a source connected to ground line 39 via second input resistor 36. First control FET 34A is turned on and off based on a voltage received from first input resistor 35 to the gate. First input resistors 35 are voltage dividing resistors that divide the output voltage of power converting device 2 and input the divided output voltage to the gate of first control FET 34A. First input resistors 35, which are the voltage dividing resistors, divide the output voltage of power converting device 2 at a predetermined ratio and input the divided output voltage to the gate of first control FET 34A. Resistances of the voltage dividing resistors are determined to resistance values at which the output voltage of power converting device 2 supplied with the commercial electric power is divided, such that the divided output voltage input to the gate of first control FET 34A turns on first control FET 34A, and first control FET 34A is turned off while no commercial electric power is supplied to power converting device 2.

First power FET 31A, which is the MOSFET of first power switch 31, is turned on while first control FET 34A is turned on. A gate of first power FET 31A is connected to the drain of first control FET 34A, and a drain voltage of first control FET 34A is input to the gate. First power FET 31A is turned on and off based on the voltage received from the drain of first control FET 34A to the gate. While first control FET 34A is turned on, second input resistors 36 connected in series are voltage dividing resistors that divide the output voltage of power converting device 2 and input the divided output voltage to the gate of first power FET 31A. Second input resistors 36, which are the voltage dividing resistors, divide the output voltage of power converting device 2 at a predetermined ratio and input the divided output voltage to the gate of first power FET 31A. Resistances of the voltage dividing resistors are determined to resistance values at which the output voltage of power converting device 2 supplied with the commercial electric power is divided, such that the divided output voltage input to the gate of first power FET 31A turns on first power FET 31A. Therefore, while first control FET 34A is turned on, a gate voltage (VGS) of first power FET 31A becomes an ON voltage. While first control FET 34A is turned off, the voltage input to the gate of first power FET 31A becomes equal to or lower than a cut-off voltage, and the gate voltage (VGS) becomes an OFF voltage. Upon being turned on, first power FET 31A supplies electric power from power converting device 2 to DC-DC converter 4 in the ON state. Upon being turned off, first power FET 31A cuts off the supply of the electric power from power converting device 2 to DC-DC converter 4.

Connection Detector 5

Connection detector 5 detects that the electric power is supplied from power converting device 2 to battery assembly control circuit 12, and outputs a connection signal to switching circuit 3. Upon detecting the connection signal received from connection detector 5, switching circuit 3 supplies electric power from battery module 1 to battery assembly control circuit 12. For example, connection detector 5 detects that operating electric power is supplied from power converting device 2 to battery assembly control circuit 12 and battery assembly control circuit 12 is activated, detects that the supply of the electric power from power converting device 2 to battery assembly control circuit 12 is started, and outputs a connection signal. At this moment, connection detector 5 outputs the connection signal when battery module 1 is dischargeable. Connection detector 5 may also detect the turning on of first control switch 34 of first input circuit 32 or first power switch 31 and output the connection signal. Alternatively, connection detector 5 may have a circuit configuration capable of detecting the start of the supply of the electric power from power converting device 2 to battery assembly control circuit 12 via DC-DC converter 4, and for example, can also detect an output current supplied from power converting device 2 to DC-DC converter 4 and output a connection signal. Switching circuit 3 may be implemented by a dedicated circuit, and may be preferably provided in battery assembly control circuit 12.

Discharge-Stop Determination Unit 6

Upon detecting a state in which discharge from battery module 1 is stopped, discharge-stop determination unit 6 outputs a discharge-stop signal to switching circuit 3. Discharge-stop determination unit 6 detects, for example, a voltage and a remaining capacity of battery module 1 to be discharged, determines whether to permit or stop the discharge of battery module 1 in order to prevent over-discharge of the battery, and outputs a discharge-stop signal while the discharge of battery module 1 is stopped. Discharge-stop determination unit 6 preferably detects the voltage and the remaining capacity of battery module 1 and outputs the discharge-stop signal. Alternatively, discharge-stop determination unit 6 can detect all other parameters such as a battery temperature for stopping the discharge of battery module 1, and output the discharge-stop signal. Discharge-stop determination unit 6 may be provided in battery assembly control circuit 12, and may be provided separately from battery assembly control circuit 12 as a dedicated circuit configuration.

Second Input Circuit 42

Switching circuit 3 shown in FIG. 2 controls supply of electric power from battery module 1 to DC-DC converter 4 by second power switch 41. Second input circuit 42 controls turning on and off of second power switch 41. Second input circuit 42 starts supply of electric power from battery module 1 to battery assembly control circuit 12 in response to a connection signal received from connection detector 5, and stops the supply of the electric power from battery module 1 to battery assembly control circuit 12 in response to a discharge-stop signal received from discharge-stop determination unit 6. Switching circuit 3 turns on second power switch 41 in response to a connection signal received from connection detector 5 to supply the electric power from battery module 1 to DC-DC converter 4 and to supply operating electric power from battery module 1 to battery assembly control circuit 12. When a discharge-stop signal is received from discharge-stop determination unit 6 to battery module 1, switching circuit 3 turns off second power switch 41 to cut off the supply of the electric power from battery module 1 to DC-DC converter 4, that is, the supply of the electric power from battery module 1 to battery assembly control circuit 12. In order to prevent battery module 1 from over-discharging, discharge-stop determination unit 6 detects the voltage and the remaining capacity of battery module 1 and detects the discharge-stop signal.

Second input circuit 42 includes second control switch 44 and second power switch 41 turned on and off by the controlled from second control switch 44. Second control switch 44 is controlled in response to a connection signal received from connection detector 5. Second power switch 41 is turned on and off by control from second control switch 44. Second control switch 44 and second power switch 41 are n-channel FETs, and second power switch 41 is a power MOSFET. Upon being turned on, second control switch 44 turns on second power switch 41. Upon being turned off, second control switch 44 turns off second power switch 41.

Second control FET 44A, which is second control switch 44, includes a gate connected to connection detector 5, a drain connected to a positive-side output of battery module 1 via fourth input resistor 46, and a source connected to ground line 49 via fourth input resistor 46. Second control FET 44A is turned on and off in response to a connection signal input to the gate from connection detector 5. The gate of second control FET 44A is connected to an output terminal of battery module 1 via third input resistor 45, and third input resistor 45 is a voltage dividing resistor that divides an output voltage of battery module 1 and inputs the divided output voltage to the gate of second control FET 44A. Third input resistor 45, which is the voltage dividing resistor, controls second power FET 41A, which is second power switch 41, via second control FET 44A in a normal voltage range of battery module 1. The resistance value of the voltage dividing resistor is determined to ne a resistance value at which second control FET 44A is not turned on when the output voltage of battery module 1 is within a predetermined range. Second input circuit 42 turns on second control FET 44A while the connection signal is received from connection detector 5 to the gate of second control FET 44A.

Second Power Switch 41

Second power FET 41A, which is the MOSFET of second power switch 41, is turned on while second control FET 44A is turned off. A gate of second power FET 41A is connected to the drain of second control FET 44A, and a drain voltage of second control FET 44A is input to the gate. Second power FET 41A is turned on and off based on the voltage input to the gate from the drain of second control FET 44A. While second control FET 44A is turned on, fourth input resistors 46 connected in series to each other are voltage dividing resistors that divide the output voltage of battery module 1 and input the divided output voltage to the gate of second power FET 41A. Fourth input resistors 46, which are the voltage dividing resistors, divide the output voltage of battery module 1 at a predetermined ratio and input the divided output voltage to the gate of second power FET 41A. Resistances of the voltage dividing resistors are determined to resistance values at which the output voltage of battery module 1 is divided, the divided output voltage is input to the gate of second power FET 41A to turn on second power FET 41A. While second control FET 44A is turned on, a gate voltage (VGS) of second power FET 41A becomes an ON voltage. While second control FET 44A is turned off, the voltage input to the gate of second power FET 41A becomes equal to or less than a cut-off voltage, and the gate voltage (VGS) becomes an OFF voltage. Upon being turned on, second power FET 41A supplies electric power from battery module 1 to DC-DC converter 4. Upon being turned off, second power FET 41A cuts off the supply of the electric power from battery module 1 to DC-DC converter 4.

Since second power FET 41A is turned on while second control FET 44A is turned on, connection detector 5 inputs a High level connection signal to the gate of second control FET 44A to turn on second control FET 44A, thereby turning on second power FET 41A. Further, discharge-stop determination unit 6 inputs a Low level discharge-stop signal to the gate of second control FET 44A to turn off second control FET 44A, thereby turning off switching second power FET 41A. Therefore, discharge-stop determination unit 6 inputs the Low level discharge-stop signal to the gate of second control FET 44A to turn off second control FET 44A, and second control FET 44A which is turned off turns off second power FET 41A, thereby stopping the supply of the electric power from battery module 1 to battery assembly control circuit 12.

In switching circuit 3 shown in FIG. 2, back-flow prevention diode 33 is connected between the output side of power converting device 2 and DC-DC converter 4, and back-flow prevention diode 43 is connected between an output side of battery module 1 and DC-DC converter 4.

Back-flow prevention diodes 33 and 43 are connected in such a direction that electric power can be supplied from power converting device 2 to a DC-DC converter 4 or electric power can be supplied from battery module 1 to the DC-DC converter 4 to prevent electric power from being supplied from DC-DC converter 4 to power converting device 2 or battery module 1.

INDUSTRIAL APPLICABILITY

The invention can be suitably used for various electricity storage devices as an electric power supply system and an electricity storage device that are capable of stably supplying operating electric power to a battery control circuit from both commercial electric power and a battery module.

REFERENCE MARKS IN THE DRAWINGS 100 electricity storage device
1 battery module
2 power converting device
3 switching circuit
4 DC-DC converter
5 connection detector
6 discharge-stop determination unit
8 load
9 commercial power supply
10 battery assembly
11 battery cell
12 battery assembly control circuit
21 converter
22 DC-AC inverter
23 bus line
31 first power switch
31A first power FET
32 first input circuit
33 back-flow prevention diode
34 first control switch
34A first control FET
35 first input resistor
36 second input resistor
39 ground line
41 second power switch
41A second power FET
42 second input circuit
43 back-flow prevention diode
44 second control switch
44A second control FET
45 third input resistor
46 fourth input resistor
49 ground line

The invention claimed is:

1. An electric power supplying method comprising:
providing an electricity storage device including
a battery module including a plurality of rechargeable battery cells and a battery assembly control circuit, and
a power converting device configured to charge the battery module using commercial electric power and supply the commercial electric power to a load;
supplying operating electric power from the power converting device to the battery assembly control circuit of the battery module while an output voltage of the power converting device is higher than a predetermined voltage,
starting to supply operating electric power from the battery module to the battery assembly control circuit in response to a connection signal from a connection detector which detects that the power converting device starts to supply electric power to the battery assembly control circuit; and
stopping supplying the electric power from the battery module to the battery assembly control circuit in response to a stop signal from a discharge-stop determination unit which detects that the battery module stops being discharged.

2. An electricity storage device comprising:
a power converting device configured to receive electric power from a commercial power supply and supply electric power to a load;
a battery module including a plurality of rechargeable battery cells and a battery assembly control circuit;
a switching circuit configured to switch electric power supplied to the battery assembly control circuit from the power converting device and the battery module;
a connection detector configured to detect that the electric power is supplied from the power converting device to the battery assembly control circuit; and
a discharge-stop determination unit configured to detect a stop of discharging of the battery module, wherein
the switching circuit is configured to:
supply electric power from the power converting device to the battery assembly control circuit while an output voltage of the power converting device is higher than a predetermined voltage;
supply operating electric power from the battery module to the battery assembly control circuit in response to a connection signal from the connection detector which detects that the electric power from the power converting device is supplied to the battery assembly control circuit; and
stop supplying the electric power from the battery module to the battery assembly control circuit in response to a discharge-stop signal from the discharge-stop determination unit.

3. The electricity storage device of claim 2, wherein the power converting device includes:
a converter configured to charge the battery module using commercial electric power; and
a DC-AC inverter configured to supply electric power of the battery module to the load.

4. An electricity storage device comprising:
a power converting device configured to receive electric power from a commercial power supply and supply electric power to a load;
a battery module including a plurality of rechargeable battery cells and a battery assembly control circuit;
a DC-DC converter configured to supply operating electric power to the battery assembly control circuit;
a switching circuit configured to switch connection between the power converting device and the battery module;
a connection detector configured to detect that electric power is supplied from the power converting device to the battery assembly control circuit; and
a discharge-stop determination unit configured to detect a stop of discharging of the battery module, wherein
the switching circuit is configured to:
connect the power converting device to the DC-DC converter while an output voltage of the power converting device is higher than a predetermined voltage, the switching circuit;
connect the battery module to the DC-DC converter in response to a connection signal from the connection detector which detects connection between the power converting device and the DC-DC converter; and cuts off the connection between the battery module and the DC-DC converter in response to a discharge-stop signal from the discharge-stop determination unit.

5. The electricity storage device of claim 4, wherein the switching circuit includes:

a first power switch connected between the power converting device and the DC-DC converter; and a first input circuit configured to control turning on and off of the first power switch by comparing the output voltage of the power converting device with the predetermined voltage, and the first input circuit is configured to:

supply electric power from the power converting device to the DC-DC converter by turning on the first power switch while the output voltage of the power converting device is higher than the predetermined voltage; and cut off the supply of the electric power from the power converting device to the DC-DC converter by turning off the first power switch while the output voltage of the power converting device is lower than the predetermined voltage.

6. The electricity storage device of claim 5, wherein the first input circuit includes a first control switch configured to switch turning on and off of the first power switch by being turned on and off controlled by the output voltage of the power converting device.

7. The electricity storage device of claim 6, wherein the first control switch comprises an FET and the first power switch comprises an FET, and the FET of the first control switch is configured to control the first power switch to control supply of the electric power from the power converting device to the DC-DC converter.

8. The electricity storage device of claim 4, wherein the switching circuit includes:

a second power switch connected between the battery module and the DC-DC converter; and a second input circuit configured to control turning on and off of the second power switch in response to the connection signal of the connection detector.

9. The electricity storage device of claim 8, wherein the second input circuit includes a second control switch configured to switch turning on and off of the second power switch by being switched in response to the connection signal from the connection detector.

10. The electricity storage device of claim 9, wherein the second power switch comprises an FET and the second control switch comprises an FET, and the FET of the second control switch is configured to control supplying of electric power from the battery module to the DC-DC converter by controlling the second power switch.

11. The electricity storage device of claim 4, wherein the switching circuit includes:

a second power switch connected between the battery module and the DC-DC converter; and a second input circuit configured to turning off the second power switch in response to the discharge-stop signal from the discharge-stop determination unit.

12. The electricity storage device of claim 11, wherein the second input circuit includes a second control switch configured to turn off the second power switch by being switched in response to the discharge-stop signal from the discharge-stop determination unit.

13. The electricity storage device of claim 12, wherein the second power switch comprises an FET and the second control switch comprises an FET, and the FET of the second control switch is configured to control supplying of electric power from the battery module to the DC-DC converter by controlling the second power switch.

14. The electricity storage device of claim 4, further comprising:

a back-flow prevention diode connected between an output side of the power converting device and the DC-DC converter; and another back-flow prevention diode connected between an output side of the battery module and the DC-DC converter.

15. The electricity storage device of claim 4, wherein the power converting device includes:

a converter configured to charge the battery module using commercial electric power; and a DC-AC inverter configured to supply electric power of the battery module to the load.

* * * * *